(12) United States Patent
Kiyohara et al.

(10) Patent No.: US 8,634,603 B2
(45) Date of Patent: Jan. 21, 2014

(54) AUTOMATIC MEDIA SHARING VIA SHUTTER CLICK

(75) Inventors: Keith Kiyohara, Santa Monica, CA (US); Henry Benjamin, Sherman Oaks, CA (US); Darren Delaye, San Francisco, CA (US); Ping Chen, Tustin, CA (US); Simon Han, Los Angeles, CA (US); Kevin Smilak, Redondo Beach, CA (US); Brian Axe, Portola Valley, CA (US); Hyduke Noshadi, Sherman Oaks, CA (US); Kedar Kanitkar, Los Angeles, CA (US); Evan Tsang, Torrance, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/590,354

(22) Filed: Aug. 21, 2012

(65) Prior Publication Data

US 2012/0314917 A1 Dec. 13, 2012

Related U.S. Application Data

(63) Continuation of application No. 13/188,879, filed on Jul. 22, 2011, now Pat. No. 8,270,684.

(60) Provisional application No. 61/368,166, filed on Jul. 27, 2010.

(51) Int. Cl.
*G06K 9/00* (2006.01)
*G06F 7/00* (2006.01)

(52) U.S. Cl.
USPC .............................. 382/118; 707/705

(58) Field of Classification Search
None
See application file for complete search history.

(56) References Cited

U.S. PATENT DOCUMENTS

| 8,358,811 B2 * | 1/2013 | Adams et al. ................. 382/118 |
| 2006/0048059 A1 * | 3/2006 | Etkin ............................. 715/745 |
| 2008/0209010 A1 * | 8/2008 | Zitnick, III et al. ........... 709/219 |
| 2010/0223663 A1 * | 9/2010 | Morimoto et al. ................. 726/7 |

* cited by examiner

*Primary Examiner* — Vikkram Bali
(74) *Attorney, Agent, or Firm* — IP Spring

(57) ABSTRACT

A computer-implemented method for automatically sharing media between users is provided. A first image is received depicting a scene with one or more persons. Face detection information is identified for each person in the first image. Identification information for each face detected is obtained without user intervention. The face detection information and the identification information are associated with the first image. The first image including the associated face detection information and identification information is sent to a server hosting a media sharing service. An access link to an event group is received. The event group includes an album of the first image and a first collection of images that share a set of common features with the first image.

20 Claims, 9 Drawing Sheets

AUTOMATIC MEDIA SHARING VIA SHUTTER CLICK

CROSS REFERENCE TO RELATED APPLICATIONS

This application is a continuation of U.S. application Ser. No. 13/188,879, filed Jul. 22, 2011, which claims the benefit of U.S. Provisional Appl. No. 61/368,166, filed Jul. 27, 2010, each of which is hereby incorporated by reference in its entirety.

TECHNICAL FIELD

This disclosure relates generally to the field of digital media, including photos and video, and more particularly to the sharing of digital media between users.

BACKGROUND

Advancements in digital image capturing technology now allow users to quickly and conveniently capture digital media, including photos and video. In addition, innovations such as the integration of digital cameras in mobile devices, inexpensive storage for digital media, and network connectivity through the Internet allow users to capture digital media from any location and share it with other users.

The sharing of digital media typically involves a user uploading media to a media sharing web site such as, for example, Picasa and Picasa Web Albums, using a browser or other application running on the user's computing device. The media is stored at a remote web server operated by the web site and later accessed by other users, with whom the user has chosen to share the media. However, as the amount of digital media and digital media collections grows, searching for particular images to share with certain users becomes cumbersome.

BRIEF SUMMARY

Embodiments relate to a computer-implemented method for automatically sharing media. In one embodiment, a first collection of images and a second collection of images associated with a first user and a second user, respectively, are received. The first collection of images contains first content data and the second collection of images contains second content data. In addition, the first and second users are associated with each other. Next, the first and second collections are automatically grouped, without user intervention, into an event group according to the first and second content data. The first and second users are then automatically provided, without user intervention, access to the event group. The event group may be automatically updated with one or more new images associated with at least one of the first and second users, and the first and second users may be automatically provided access to the updated event group.

In another embodiment, a system for automatically sharing media includes at least one memory, a media input module, and a media sharing module. The media input module and the media sharing module are located in the at least one memory. The media input module is configured to receive a first collection of images associated with a first user and a second collection of images associated with a second user, where the first collection contains first content data and the second collection contains second content data. In addition, the first and second users are associated with each other. The media sharing module is configured to automatically group, without user intervention, the first and second collections into an event group according to the first and second content data. The media sharing module is further configured to automatically provide, without user intervention, the first and second users access to the event group. The event group may be automatically updated by the media sharing module with one or more new images associated with at least one of the first and second users, and the first and second users may be automatically provided access to the updated event group.

Embodiments may be implemented using hardware, firmware, software, or a combination thereof and may be implemented in one or more computer systems or other processing systems.

Further embodiments, features, and advantages, as well as the structure and operation of the various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of the present disclosure and, together with the description, further serve to explain the principles of the disclosure and to enable a person skilled in the relevant art(s) to make and use embodiments thereof.

DETAILED DESCRIPTION

Table of Contents

Figure 1:
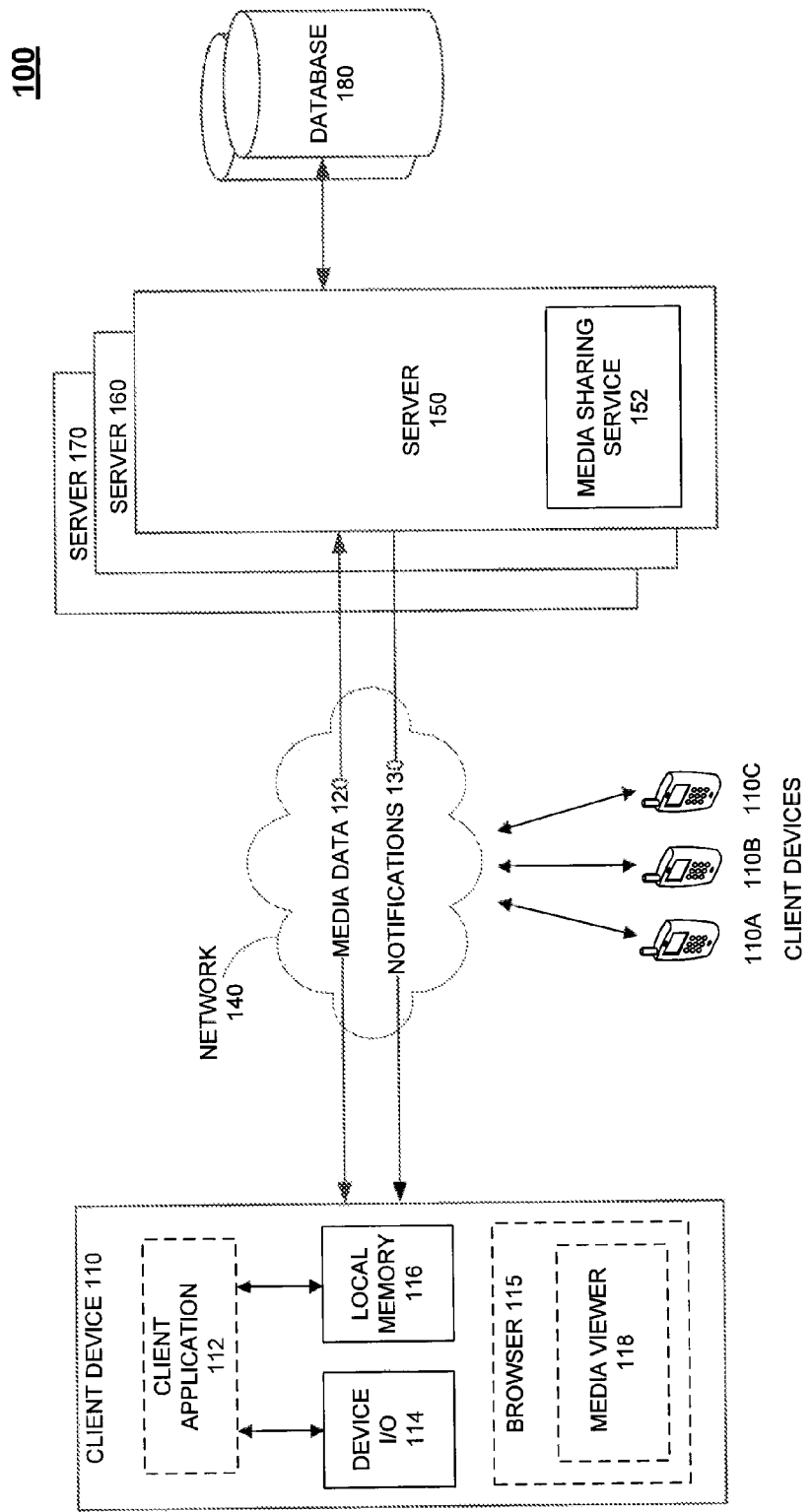
FIG. 1 is a diagram of an exemplary system in which embodiments may be implemented.

I. Overview
II. System
    A. Client Application
    B. Media Sharing Service
        1. Face Recognition
        2. Landmark and Object/Scene Recognition
        3. Metadata Extraction
        4. Image Grouping
            a. Album Segmentation
            b. Event Clustering and Sharing
            c. Real-time Event Sharing
III. Method
    A. Automatic Media Sharing Between Users
    B. Client Application
    C. Album Segmentation
    D. Event Clustering
IV. Example Computer System Implementation
V. Conclusion

I. Overview

To facilitate the searching and sharing of images, users can organize digital media collections into different folders by album name or by date. Users can also associate tags or tag words with an image or group of images. Tags include one or more keywords that describe the content of the image. However, organization schemes involving user-provided tags do not scale well for large image collections from diverse sources. For example, users may fail to consistently and/or accurately tag all available images, and there may be differences in tags provided by different users for the same image. Furthermore, significant user input is required to tag a large number of images and consequently, users are unlikely to tag all of the available images. To share a group of images, each user must manually organize, tag, and upload a group of images to a media sharing web site. Moreover, this is particularly difficult for mobile phone users for whom data entry is cumbersome or for users who do not have the time to organize and enter descriptive data for media they wish to share.

In addition, media sharing sites generally do not provide the capability to automatically group images from multiple users. For example, a user may wish to share images taken at an event with other attendees of the event. Similarly, other attendees may wish to share their images from the event with the user. Although two or more users may be able to create a collaborative album or image collection that contains images from multiple users, the creation and update of such an album or image collection is still a manual process for the users.

Embodiments relate to automatically sharing media between users. Embodiments automatically group, without user intervention, digital media, including photos and video, associated with a user into one or more albums based on the content of the media objects. Furthermore, embodiments automatically group, without user intervention, albums from multiple users into one or more event groups based on the content of the albums. The automatically generated event group(s) may then be shared between multiple users depending on the users' associations with each other and their individual sharing preferences. Embodiments also enable the event group(s) to be updated with new images and automatically share the update event group(s) between the users.

For example, a first user and a second user may belong to a social network in which each user allows the other access to each other's digital media collection, including photos and videos. The first and second users may capture photos from a particular event they both attend. Each user may store event photos along with other unrelated photos. Embodiments automatically determine the content of the photos associated with each user, group the photos corresponding to the event into an event group, and share the event group, including any new event photos, between the users. Embodiments may use a number of different techniques including, but not limited to, face recognition, landmark recognition, and scene or object recognition to determine the content of media. Embodiments may also extract metadata from media to determine its content.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "media" and "digital media" are used interchangeably herein to refer broadly and inclusively to digital photographs, or digital photos, and digital video. The term "image" is used herein to refer broadly and inclusively to a digital photograph depicting an image of a scene and items within that scene, including, but not limited to, one or more persons, one or more landmarks, and/or one or more objects. In addition, the term "image(s)" may refer to one or more frames from at least a portion of a digital video. Furthermore, the terms "photograph/photo," "video," "media," and "image" are used herein to refer to digital photos and digital video whether or not the terms are modified by the term "digital."

The term "media sharing site" is used herein to refer broadly and inclusively to any web site, service, framework, or protocol adapted to share digital media, including photos and videos, between various users. Such a web site or service may also include social networking sites with the added capability to share media between members of the site.

The terms "image capture device" and "image capturing device" are used interchangeably herein to refer broadly and inclusively to any device adapted to capture digital media, including photos and videos. Examples of such devices include, but are not limited to, digital cameras, mobile devices with an integrated digital camera. Furthermore, it is assumed herein that images are captured using such a device by manually pressing, selecting, or clicking a button or key that opens a shutter device for image exposure purposes. However, it should be noted the term "shutter" is used herein to also refer broadly and inclusively to any type of button or key on the image capture device that is used to capture the image (i.e., by invoking the shutter device).

II. System

FIG. 1 is a diagram illustrating a system 100 in which embodiments described herein can be implemented. System 100 includes client devices 110 and 110A-C, a client application 112, device input 114, local memory 116, a browser 115, a media viewer 118, media 120, notifications 130, a network 140, servers 150, 160, and 170, a media sharing service 152, and a database 180.

Client devices 110, 110A, 110B, and 110C communicate with one or more servers 150, 160, and 170, for example, across network 140. Although only servers 150, 160, and 170 (hereinafter collectively referred to as "server(s) 150") are shown, more servers may be used as necessary. Similarly, although only client devices 110 and 110A-C are shown, more client devices may be used as necessary. Client device 110 is communicatively coupled to network 140 through a communications interface. Client device 110 can be any type of computing device having one or more processors and a communications infrastructure capable of receiving and transmitting data over a network. Client device 110 also includes device input 114. Device input 114 may be any kind of user input device coupled to client device 110 including, but not limited to, a mouse, QWERTY keyboard, touchscreen, microphone, or a T9 keyboard. Client device 110 can include, but is not limited to, a mobile phone, a personal digital assistant (PDA), a computer, a cluster of computers, a set-top box, or other similar type of device capable of processing instructions and receiving and transmitting data to and from humans and other computing devices.

Server(s) 150 similarly, can be any type of computing device capable of serving data to client device 110. Server(s) 150 execute media sharing service 152. Although media sharing service 152 is shown with respect to server 150, media sharing service 152 may be implemented on any server. Furthermore, the functionality of media sharing service 152 may be implemented on a single server, such as, for example, server 150, or across multiple servers, such as, for example, servers 150, 160, and 170, in a distributed or clustered server environment.

In an embodiment, server(s) 150 are communicatively coupled to database 180. Database 180 may be any type of data storage known to those of skill in the art. In an example, the data storage may be a database management system, such as an ORACLE database or other databases known to those skilled in the art. Database 180 may store any type of media and any corresponding media data accessible by server(s) 150. Although only database 180 is shown, more databases may be used as necessary.

In an embodiment, local memory 116 is used to store information accessible by client device 110. For example, information stored in local memory 116 may include, but is not limited to, one or more digital media files, contact information for one or more users, or any other type of information in a digital format. Local memory 116 may be any type of recording medium coupled to an integrated circuit that controls access to the recording medium. The recording medium can be, for example and without limitation, a semiconductor memory, a hard disk, or other similar type of memory or storage device. Moreover, local memory 116 may be integrated within client device 110 or may be a stand-alone device communicatively coupled to client device 110 via a direct connection. For example, local memory 116 may include an internal memory device of client device 110, a compact flash card, a secure digital (SD) flash memory card, or other similar type of memory device.

Network 140 can be any network or combination of networks that can carry data communication. Such network 140 can include, but is not limited to, a wired (e.g., Ethernet) or a wireless (e.g., Wi-Fi and 3G) network. In addition, network 140 can include, but is not limited to, a local area network, medium area network, and/or wide area network such as the Internet. Network 140 can support protocols and technology including, but not limited to, Internet or World Wide Web protocols and/or services. Intermediate network routers, gateways, or servers may be provided between components of system 100 depending upon a particular application or. environment.

In an embodiment, client devices 110 and 110A-C execute client application 112. In a further embodiment, client devices 110 and 110A-C execute media viewer 118. The operation of client application 112 and media viewer 118 are described in further detail below. Client application 112 and media viewer 118 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

In an embodiment, as illustrated in FIG. 1, client device 110, via client application 112, media viewer 118, or any combination thereof, may send or receive media data 120 to or from media sharing service 152 on server(s) 150. Media data 120 includes one or more media files. The media files may be photos, video, or a combination of both. In addition, the media files may include media content information and metadata corresponding to the media to be sent or retrieved. Client application 112 and media viewer 118 may present a visual representation of the retrieved media on a display of client device 110. Such a display can be any type of display for viewing digital photos and/or video or can be any type of rendering device adapted to view digital photos and/or video.

In an embodiment, media viewer 118 can be a standalone application, or it can be executed within a browser 115, such as, for example, Google Chrome or Microsoft Internet Explorer. Media viewer 118, for example, can be executed as a script within browser 115, as a plug-in within browser 115, or as a program, which executes within a browser plug-in, such as, for example, the Adobe (Macromedia) Flash plug-in. In an embodiment, client application 112 and/or media viewer 118 are integrated with media sharing service 152.

In an embodiment, client device 110 is also configured to receive notifications 130 from media sharing service 152 over network 140. In an embodiment, notifications 130 include an access link to a location on the web where the media to be shared is stored. For example, the access link may include a location to a web site in the form of a web location address such as a uniform resource locator (URL). Notifications 130 may be sent from media sharing service 152 to client device 110 using any of a number of different protocols and methods. For example, notifications 130 may be sent from media sharing service 152 via electronic mail or Short Message Service (SMS). Notifications 130 may be received at client device 110 by client application 112, media viewer 118, or any other application or utility adapted to receive such notifications, such as, for example, an electronic mail client or SMS application.

A. Client Application

Figure 2:
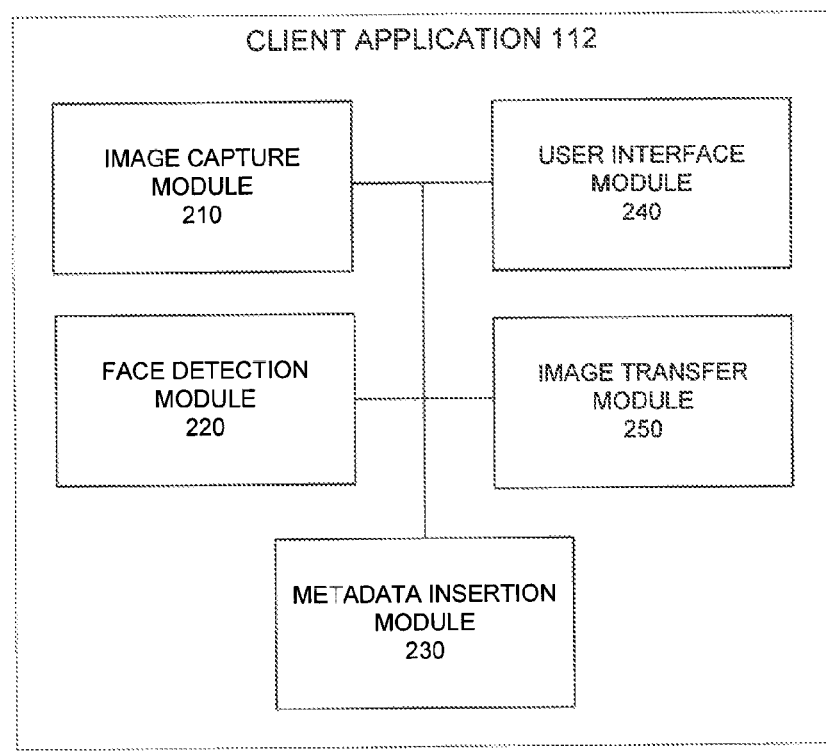
FIG. 2 is a diagram of an example of a client application in accordance with an embodiment.

FIG. 2 is a diagram illustrating an exemplary embodiment of client application 112 of client device 110 of FIG. 1. Client application 112 includes image capture module 210, face detection module 220, metadata insertion module 230, user interface module 240, and image transfer module 250. Each of the components of client application 112, including image capture module 210, face detection module 220, metadata insertion module 230, user interface module 240, and image transfer module 250, may be communicatively coupled to one another.

In operation, client application 112 uses user interface module 240 to display an option to a user at client device 110 to capture a digital image. Upon the user's selection of the option, client application 112 uses image capture module 210 to capture the digital photo or video. To capture the image, image capture module 210 can be coupled to an image capture device (not shown), such as, for example, a digital camera integrated with client device 110. In addition, user interface module 240 can be coupled to a user input device, such as, for example, a touch screen or input button at client device 110 (e.g., device input 114). Once the photo or video is captured, it can be stored by image capture module 210 at client device 110, for example, in local memory 116.

Face detection module 220 can be configured to analyze media after it is captured by image capture module 210. In an embodiment, face detection module 220 can also analyze media previously captured and stored at client device 110. Such stored media may have been captured using the image capturing device at 110 (e.g., by image capture module 210 or another application executed at client device 110) or may have been captured using a separate image capturing device not coupled to client device 110 and later transferred to local memory 116. Face detection module 220 can be configured to analyze one or more images, or images specified by a user, to detect faces within the image(s). For example, if a user transfers an album of digital photos to local memory 116, face detection module 220 can analyze each digital photo in that album to detect faces.

When a face is detected, face detection module 220 can make a digital copy of an area encompassing the detected face, for example, a rectangular area encompassing the detected face, to produce a facial image or facial model corresponding to the detected face. The facial image can then be stored in local memory 116. Alternatively, the facial image can be stored in a facial image database (not shown), which is accessible by client application 112 via a network (e.g., network 140). In an embodiment, face detection module 220 can use stored facial images to aid in detecting faces in subsequently analyzed images.

A person skilled in the relevant art given this description would appreciate that any one of several well-known techniques may be used in face detection module 220 to detect faces in images. Examples of such techniques include, but are not limited to, elastic bunch graph matching as described in U.S. Pat. No. 6,222,939, using neural networks on "gabor jets" as described in U.S. Pat. No. 6,917,703, and face detection using boosted primitive features as described in U.S. Pat. No. 7,099,510.

In some cases, the automatic face detection of face detection module 220 may not detect all faces in an image. Therefore, in some embodiments, the user may trigger face detection module 220 specifically to process a specified image. For example, face detection module 220 may not detect one or more faces in an image. In this case, in an embodiment, face detection module 220 provides the capability for the user to manually assist the face detection process. For example, user interface module 210 may present a graphical user interface to draw a bounding area, or a bounding box, around each face that the user wants detected. One skilled in the relevant art given this description would understand that the same facial detection technique may be used in the automatic face detection as well as the manually-assisted face detection with slight modifications. For example, when manually assisted, the face detection software may simply attach a greater weight to facial landmark features identified within the defined area.

In an embodiment, once the faces are detected using face detection module 220, user interface module 240 may display one or more user input fields, which the user can use to provide additional descriptive data to identify the person corresponding to the detected face. For example, the user can provide a name with which to tag the detected facial image. The tag can later be used to identify the person in other images. The descriptive data may also include, but is not limited to, contact information for the identified person. Upon user entry of additional information corresponding to the detected facial image(s), metadata insertion module 230 can be configured to associate or annotate the image with the detected face information (e.g., facial images produced by face detection module 220) in addition to any user-provided information including, but not limited to, tag name(s) for the identified person(s), contact information for each identified person(s), and/or image caption or description information.

In an embodiment, face detection module 220 may use stored facial images to identify the detected face(s). As described above, the facial images may be stored in local memory 116 or in a facial database accessible by client application 112 over network 140. Such a facial database can be any kind of database adapted to store facial images in addition to metadata, including name and/or contact information of the person corresponding to each facial image. The stored facial image can also include metadata of its own, including identification information for the identity of the person corresponding to the facial image. For example, the identification information may include a name and contact information.

Thus, in this embodiment, the user would no longer be required to provide identification information for the detected face. The advantage of this embodiment is that metadata insertion module 230 can associate detected face information and the corresponding identification information without further user intervention. However, face detection module 220 may need to be configured with additional face recognition functionality in order to match the detected faces with stored facial images or facial models. Such face recognition functionality would operate similarly to that of face recognition module 332 of media sharing service 152 of FIG. 3, described below.

In an embodiment, metadata insertion module 230 may also associate with the image(s) other metadata including, but not limited to, a time when the image(s) was taken and a location where the image(s) was taken. For example, client device 110 may include a global positioning satellite (GPS) receiver and metadata insertion module 230 may be configured to associate with the image(s) a location where the image(s) was taken in addition to any other information. A person skilled in the relevant art given this description would recognize that any number of well-known information formats might be used for the metadata. For example, the location of an image may include latitude and longitude coordinates corresponding to a geographic location where the image was captured.

In an embodiment, image transfer module 250 transfers one or more images from client device 110 to media sharing service 152 of server(s) 150, shown in FIG. 1, over network 140. The transferred image(s) includes metadata information associated with the image(s) by metadata insertion module 230. Image transfer module 250 is configured to transfer the image(s) via a communications interface of client device 110. The image(s) may be transferred by image transfer module 250 using any number of well-known methods for transferring digital files between client device 110 and media sharing service 152 over network 140.

Embodiments of image capture module 210, face detection module 220, metadata insertion module 230, user interface module 240, and image transfer module 250 can be implemented in software, firmware, hardware, or any combination thereof. Embodiments of image capture module 210, face detection module 220, metadata insertion module 230, user interface module 240, and image transfer module 250, or portions thereof, can also be implemented as computer-readable code executed on one or more computing devices capable of carrying out the functionality described herein. Examples of such computing devices include, but are not limited to, a computer, workstation, embedded system, networked device, mobile device, or other type of processor or computer system capable of carrying out the functionality described herein.

In addition, image capture module 210, face detection module 220, metadata insertion module 230, user interface module 240, and image transfer module 250 shown to be within client application 112, represent functionality in implementing embodiments of the present disclosure. One skilled in the art will understand that, more or fewer modules than shown in client application 112 may be implemented in software to achieve the functionality of the present disclosure.

B. Media Sharing Service

Figure 3:
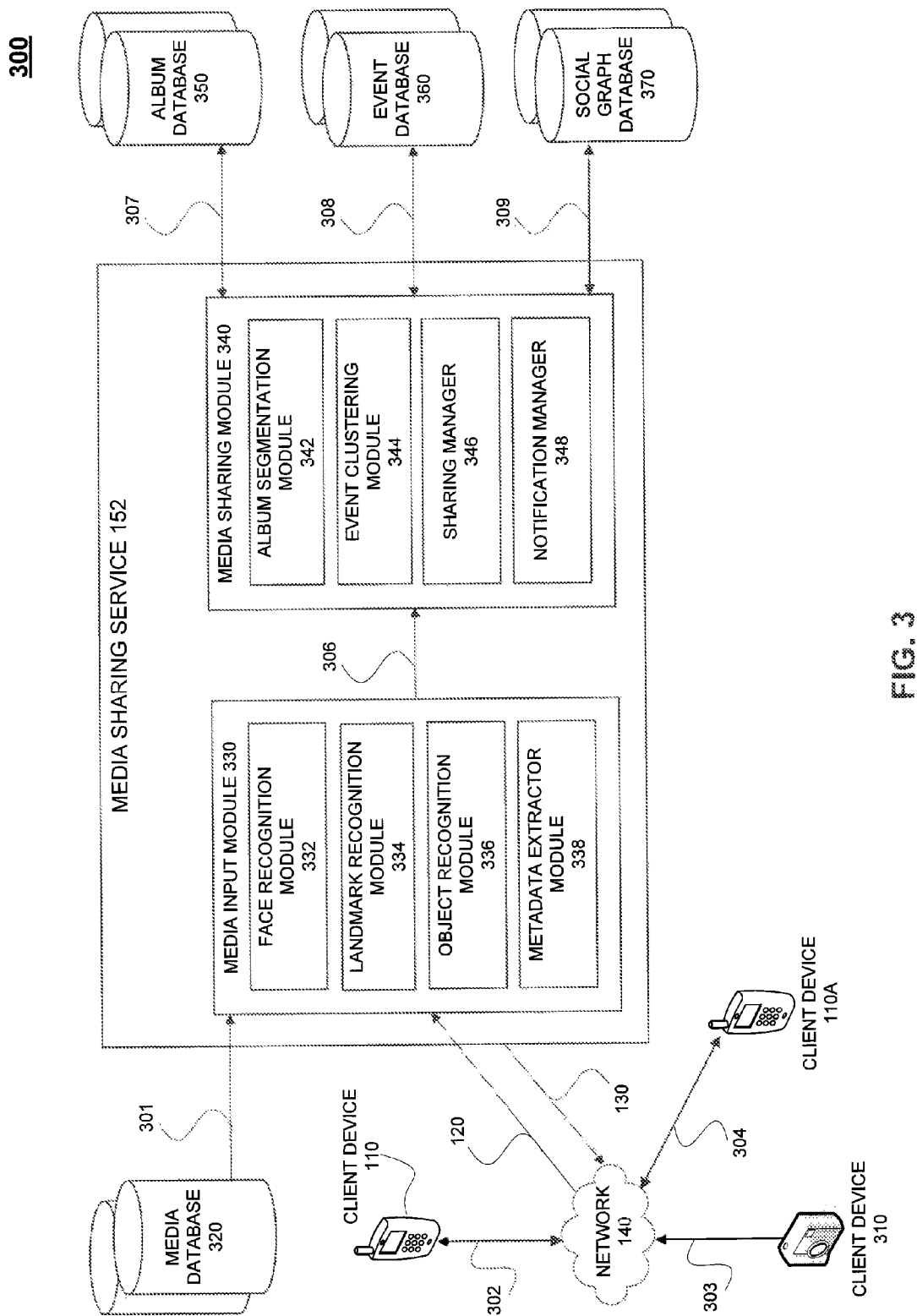
FIG. 3 is a diagram of an example of a system in which a media sharing service may be implemented in accordance with an embodiment.

FIG. 3 is a diagram illustrating an embodiment of an exemplary system 300 in which media sharing service 152 may be implemented. System 300 includes a client device 310, a media database 320, media sharing service 152 of FIG. 1, an album database 350, an event database 360, and a social graph database 370. Media sharing service 152 includes various component modules including a media input module 330 and a media sharing module 340. Media input module 330 includes a face recognition module 332, a landmark recognition module 334, an object recognition module 336, and a metadata extractor module 338.

Media database 320 may store any type of media data such as photograph or video data. The images may, for example, be photographs taken from a digital camera. The images may be encoded in JPEG, TIFF, or other similar format for digital image files. Each image may have metadata associated with the image. For example, an image may have an exchangeable image file format (EXIF) header that stores information such as a time when the photograph of the image was taken, a location where the photo was taken, and information about the image capturing device, such as, for example, a digital camera, that captured the image, such as make, model, focal length and zoom. The time the image was taken may correspond to the time in which the image was exposed by the image capturing device. A video includes a sequence of frames, and each frame includes an image. The video may also be captured using an image capturing device able to capture video, such as, for example, a digital camera.

In an example, media database 320 may be coupled to a media sharing site (not shown), such as Picasa. A user may upload the media from the media sharing site to media database 320. For example, referring back to FIG. 1, the user may use browser 115 at client device 110 to navigate to the media sharing site and upload images to media database 320 via a user interface provided by the media sharing site. In a further example, the user may also be able to retrieve images from media database 320. For example, the user may have a choice to either download images onto client 110 for storage in local memory 116 or view the images using media viewer 118, which may also be coupled to the media sharing site.

Media data 301 is retrieved from media database 320 by media input module 330. Media input module 330 may retrieve media data 301 from media database 320 using, for example, an SQL select statement. Alternatively, media input module 330 could access media database 320 using a web service. Media database 320 may have one or more intermediate servers that may push media data 301 to media input module 330. Like media data 120, described above, media data 301 may include one or more image files. The image files may be photographs, frames from one or more videos, or a combination of both. The image files may include image content and metadata, such as, for example, metadata information added by metadata insertion module 230 of client application 112, illustrated in FIG. 2.

Media input module 330 may also receive media data 120 over network 140 from one or more of client device 110 via communication channel 302, client device 110A via communication channel 304, and/or client device 310 via communication channel 303. Although only client device 110, client device 110A, and client device 310 are shown, additional client devices may be used as necessary. Client device 310 may include any image capturing device with the capability to send captured images to server(s) 150, including media sharing service 152, over network 140. For example, client device 310 may be a standalone digital camera including, but not limited to, digital camera with an EYE-FI SD card, which provides the capability to store images and directly upload stored images to a media sharing site.

Upon receiving media data 120 and/or retrieving media data 301, media input module 330 sends media data 120 and/or media data 301 to face recognition module 332, landmark recognition module 334, object recognition module 336, and metadata extractor module 338.

1. Face Recognition

Face recognition module 332 interprets the content of media data 120 and/or media data 301 (hereinafter collectively referred to as "media data 120/301") by performing automatic face recognition to recognize one or more faces. The automatic face recognition of face recognition module 332 may function in two stages: a face detection stage and a face recognition stage. However, face recognition module 332 may be able to skip the face detection stage for media data 120/301 if face detection information is already included with media data 120/301. For example, the image may have been sent by client application 112 of client device 110, which already performs face detection and includes the face detection information with the image file. Since not all images include face detection information, face recognition module 332 must determine whether an image file it receives includes such information and based on the determination, perform face detection as necessary.

The face detection stage of face recognition module 332 includes automatically detecting faces in images of media data 120/301. Such automatic detection may be based on, for example, general facial characteristics. Face recognition module 332 analyzes the images to detect faces within the images. When one or more faces are detected, face recognition module 332 may generate face detection information corresponding to each detected face including, for example, a bounded region encompassing the detected face within the image. In an embodiment, face recognition module 332 may enable a user to manually assist face detection, for example, through client application 112 and/or media viewer 118. In such an embodiment, the operation of the face detection stage is similar to the manual or user assisted operation of face detection module 220 of FIG. 2, described above.

The face recognition stage of face recognition module 332 includes identifying the detected faces. The operation of face recognition module 332 may include making comparisons of detected faces against one or more of facial images that have been previously recognized. For example, the previously recognized faces may be stored in one or more facial image databases (not shown) accessible by face recognition module 332. A person skilled in the relevant art given this description would appreciate that any one of several methods for face detection and recognition may be used. One example of such a method is described in Lui and Chen, "Video-based Face Recognition Using Adaptive Hidden Markov Models", 2001, CVPR.

2. Landmark and Object/Scene Recognition

Landmark recognition module 334 detects portions of images of media data 120/301 that have a landmark and identifies the landmark. One example of landmark recognition module 334 is described in commonly owned U.S. patent application Ser. No. 12/119,359 entitled "Automatic Discovery of Popular Landmarks," incorporated by reference herein in its entirety. Landmark recognition module 334 may, for example, use visual clustering to recognize landmarks.

Object recognition module 336 interprets images of media data 120/301 to recognize objects within a scene represented by the images. For example, media data 120/301 may include an image of a scene, and object recognition module 336 may recognize an object in that image. In another example, object recognition module 336 may recognize an object in one or more frames of a video. Object recognition module 336 may be any type of object recognition module as known to those skilled in the art. In general, the operation of object recognition module 336, like face recognition module 332, may include two steps. First, a portion of an image including an object is detected. Second, the portion of the image is put through a function, such as a classifier function, that identifies the object. A person skilled in the relevant art given this description would recognize that object recognition module 336 may include additional subcomponents, including other recognition modules, configured to detect different types of objects.

In some embodiments, object recognition module 120 may use hidden Markov models to select and match particular objects to an object in a set of known objects. In the case where media data 104 is a video, object recognition module 120 may track an object across one or more frames and then recognize the object based on the tracked frames.

By recognizing faces using face recognition module 332, landmarks using landmark recognition module 334, and objects using object recognition module 336, media input module 330 determines media content data 306. Media content data 306 may include, for example, a collection of media and meta-information of faces, landmarks, and/or objects corresponding to the content of the collection of media. In addition to using the content of media data 120/301 to determine media content data 306, media input module 330 may extract metadata directly from media data 120/301 using metadata extractor module 338, according to an embodiment.

3. Metadata Extraction

Metadata extractor module 338 may, for example, extract metadata included with media data 120/301. Media data 120/301 may be, for example, a collection of media files, and each media file may include metadata, as described above. In an embodiment, a media file may be a photographic image file, such as a JPEG or TIFF. The photographic image file may include an EXIF header with data about the image. An EXIF header may, for example, include data such as when the photo was taken. For example, client device 310 may include a location sensor, such as a GPS sensor. Image files generated by client device 310 may include a location where each photo was taken in their EXIF headers. For example, the EXIF header may have latitude and longitude values corresponding to where the picture was taken. In this way, metadata extractor module 338 reads metadata from media data 120/301 to be included with media content data 306.

Embodiments of face recognition module 332, landmark recognition module 334, object recognition module 336, and metadata extractor module 338 can be implemented in software, firmware, hardware, or any combination thereof Embodiments of face recognition module 332, landmark recognition module 334, object recognition module 336, and metadata extractor module 338, or portions thereof, can also be implemented to run on any type of processing device including, but not limited to, a computer, workstation, embedded system, networked device, mobile device, or other type of processor or computer system capable of carrying out the functionality described herein.

4. Image Grouping

Using media content data 306, media sharing module 340 automatically groups the collection of media from different users and shares the grouped media between the users based on the content of the media and the associations between the users. For example, media input module 330 may receive or acquire different images, perhaps whole albums of images, where each image and/or album is associated with a different user. The users themselves may be associated with each other, for example, as members of the same social network or social graph in which the users are linked or associated with each other via sharing preferences designated, for example, on a social networking site. In an example, each user may have member profile information stored at the social networking site. In addition, each user's profile may have a sharing preference that specifies the media sharing or access rights and privileges the user provides to other users. The sharing preference may be used to identify other users with whom the user chooses to share media. For example, the sharing preference of a first user may identify a second user, where the first and second users are associated with each other. In general, users associated with each other provide media sharing privileges to one another, in which each user is allowed access to images associated with the other user. Thus, users associated with each other may identify one another via their sharing preferences. A person skilled in the relevant art given this description would recognize any number of known methods for associating sharing preferences with a user and for associating different users with each other.

a. Album Segmentation

Media sharing module 340 automatically interprets media content data 306 to group images associated with each individual user into one or more albums for the user. Media sharing module 340 then automatically interprets media content data 306 to group albums corresponding to different users into one or more event groups, where the event group includes media associated with the different users. Media sharing module 340 then automatically shares, without user intervention, the event group(s) between the different users based on their social graph or association with each other. In an embodiment, media sharing module 340 also sends notifications of the available event group(s) to the users.

Media sharing module 340 includes an album segmentation module 342, an event clustering module 344, a sharing manager 346, and a notification manager 348. In an embodiment, media sharing module 340 is communicatively coupled to each of album database 350, event database 360, and social graph database 370 via communication lines 307, 308, and 309 respectively.

Album segmentation module 342 segments the collection of media from media input module 330 by grouping the collection of media into one or more albums based on the media content data information included in media content data 306. Album segmentation module 342 determines the media content data corresponding to each image of the collection of media using media content data 306. Based on the determined media content data of each image, album segmentation module 342 segments the collection of media into one or more albums.

For example, media content data 306 may include the time and location (e.g., in GPS coordinates) of when and where images of the collection of media were captured. Based on the determined time and location of each image of the collection, album segmentation module 342 would segment the collection or group of images into one or more albums in which each album contains images having substantially similar time and location information. To improve the accuracy of the segmentation operation and the correlation of content between different images in a segmented album, album segmentation module 342 segments the collection of media based on as much information it can derive from media content data 306. For example, album segmentation module 342 may use face recognition information, landmark recognition information, object recognition information, metadata, or any combination thereof to segment the collection of images into an album(s).

In an embodiment, album segmentation module 342 may search album database 350 for existing albums containing images with similar media content data as a particular image or group of images received from media input module 330. Using the previous example described above, album segmentation module 342 may find an existing album in album database 350 containing images having substantially similar time and location information as the image(s) from media input module 330. In this example, album segmentation module 342 would add the image(s) to the existing album. If no existing album is found that matches the search criteria (e.g., images with similar media content data), album segmentation module 342 may create one or more new albums. In an embodiment, album segmentation module 342 may use album database 350 to store the new album(s). Album segmenting module 342 associates each album with the user associated with the group of images.

b. Event Clustering and Sharing

Event clustering module 344 clusters the albums, segmented by album segmenting module 342, by grouping the albums into one or more event groups based on the media content data information included in media content data 306 and sharing preferences associated with two or more users. The clustering operation of event clustering module 344 is similar to the segmenting operation of album segmenting module 342, except that even clustering module 344 groups albums, where different albums are associated with different users. As discussed above, different users may be associated with each other via sharing preferences that identify one another. Also as discussed above, such preferences are used to determine which users have privileges to access media associated with a particular user.

Event clustering module 344 uses sharing manager 346 to determine sharing preferences and associations between different users. In an embodiment, sharing manager 346 is communicatively coupled with social graph database 370. Social graph database 370 may store any type of association between two or more users who have a social relationship with each other. Such association may include sharing preferences of the users, where the sharing preferences specify access rights or privileges each user has with the other. Embodiments of sharing manager 346 and social graph database 370 may be integrated, for example, with one or more social networking sites, photo sharing sites, or other similar types of sites that enable associations or social connections between different users.

In an embodiment, sharing manager 346 retrieves stored associations between two or more users, including the users' sharing preferences, from social graph database 370. The retrieved information regarding the users in combination with media content data 306 is used by event clustering module 344 to cluster albums into one or more event groups. Once the event group(s) is clustered by event clustering module 344, sharing manager 346 associates the event group(s) with the users and provides the users with access to the event group(s) based on the association of the users with each other and each user's individual sharing preference. In an embodiment, event database 360 may be used to store the association of users with event groups.

For example, a first album of images captured at a particular time and location, corresponding to a social event, may be associated with a first user. A second album of images captured at the same time and location, i.e., event, may be associated with a second user. In addition, there may be other albums of images, also captured at the event, associated with other users. In this example, even clustering module 344 may use sharing manager 346 to determine which the associations and sharing preferences of the users. If sharing manager 346 identifies an association between the first and second users and each user's sharing preference provides sharing privileges to the other, event clustering module 344 may, for example, cluster the first and second albums into an event group of images captured at the same time and location. The event group in this example would contain images associated with both users. Once the event group is created by clustering module 344, clustering module 344 may store the event group in event database 360. Sharing manager 346 may then provide the first and second users with access to the event group.

In an embodiment, notification manager 348 is configured to automatically send notifications (e.g., notifications 130 of FIG. 1) to one or more users of the event group. In an embodiment, the notification includes an access link to the event group. For example, the access link may be web-based location address in the form of a uniform resource locator (URL) address, which users can select to be automatically directed to the event group. Referring back to FIG. 1, the images of the event group may be accessible, for example, via client application 112, media viewer 118, or similar type of application the user can use to view media.

In an embodiment, event clustering module 344 may search event database 360 for existing event groups to add a newly clustered event group based on substantially similar content data. Event clustering module 344 may add the clustered event group to a matching event group if found in event database 360. Alternatively, event clustering module 344 may create a new event group in event database 360 for the clustered event group if a matching event group is not found in event database 360.

c. Real-time Event Sharing

In an embodiment, sharing manager 346 may automatically enable real-time access and sharing to an event group based on the content information of media content data 306. For example, sharing manager 346 may use time and location metadata determined from media content data 306 in combination with social graph information from social graph database 370 to enable real-time access and sharing to an event group based on the time, location, and social graph information.

To illustrate an example of real-time sharing via sharing manager 346, assume images of an event are captured by a first user and a second user during the event. Event clustering module 344 may, for example, automatically generate an event group for the event based on the content of media captured during the event by the first and second users. Media content data 306 may include, for example, the time and location of when and where the images were captured. In this example, sharing manager 346 may determine that the first and second users are associated with each other and have matching sharing preferences (e.g., the first user allows media sharing privileges for the second user and vice versa). Based on the time and location information, sharing manager 346 would determine both users are at the same event and consequently, begin to automatically associate the first and second users with the event group and provide the users access to the event group. Notification manager 348 may, for example, send notifications, including an access link to the event group, to the first and second users. The first and second users may receive the notifications on, for example, their respective mobile devices. The first and second users would then be able to view the images of the event group using, for example, their respective mobile devices (e.g., in client application 112 or media viewer 118 of FIG. 1). This enables the first and second users to automatically and efficiently share media between each other during the event.

Embodiments of album segmentation module 342, event clustering module 344, sharing manager 346, and notification manager 348 can be implemented in software, firmware, hardware, or any combination thereof. Embodiments of album segmentation module 342, event clustering module 344, sharing manager 346, and notification manager 348, or portions thereof, can also be implemented to run on any type of processing device including, but not limited to, a computer, workstation, embedded system, networked device, mobile device, or other type of processor or computer system capable of carrying out the functionality described herein.

Album database 350, event database 360, and social graph database 370 may be any type of data storage known to those of skill in the art. In an example, the data storage may be a database management system, such as an ORACLE database or other databases known to those skilled in the art. Album database 350 and event database 360 may store any type of media such as images or video (e.g., organized into albums or event groups respectively) in addition to meta-information, including metadata and other content information, corresponding to the images or video.

Referring back to FIG. 1, although media sharing service 152 is shown with respect to server(s) 150, it should be noted that embodiments of media sharing service 152 and its components (media input module 330 and media sharing module 340), or portions thereof, can be implemented on a single server, such as, for example, server 150, or across multiple servers, such as, for example, servers 150, 160, and 170, in a distributed or clustered server environment. Furthermore, subcomponents of media input module 330 (face recognition module 332, landmark recognition module 334, object recognition module 336, and metadata extractor module 338), or portions thereof, can be implemented on a single server or across multiple servers. Similarly, subcomponents of media sharing module 340 (album segmentation module 342, event clustering module 344, sharing manager 346, and notification manager 348), or portions thereof, can be implemented on a single server or across multiple servers.

III. Method

A. Automatic Media Sharing Between Users

Figure 4A:
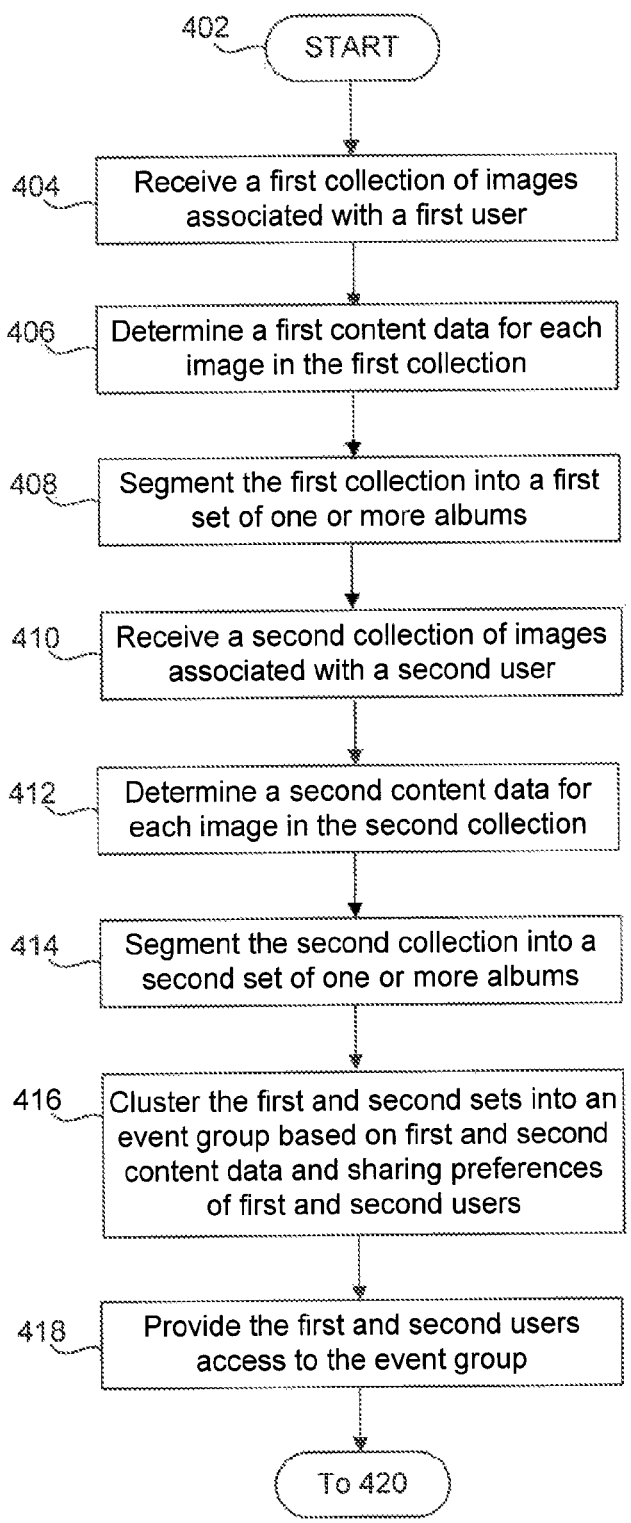
FIG. 4A is a flowchart of an example of a method for automatically sharing media between users in accordance with an embodiment.
Figure 4B:
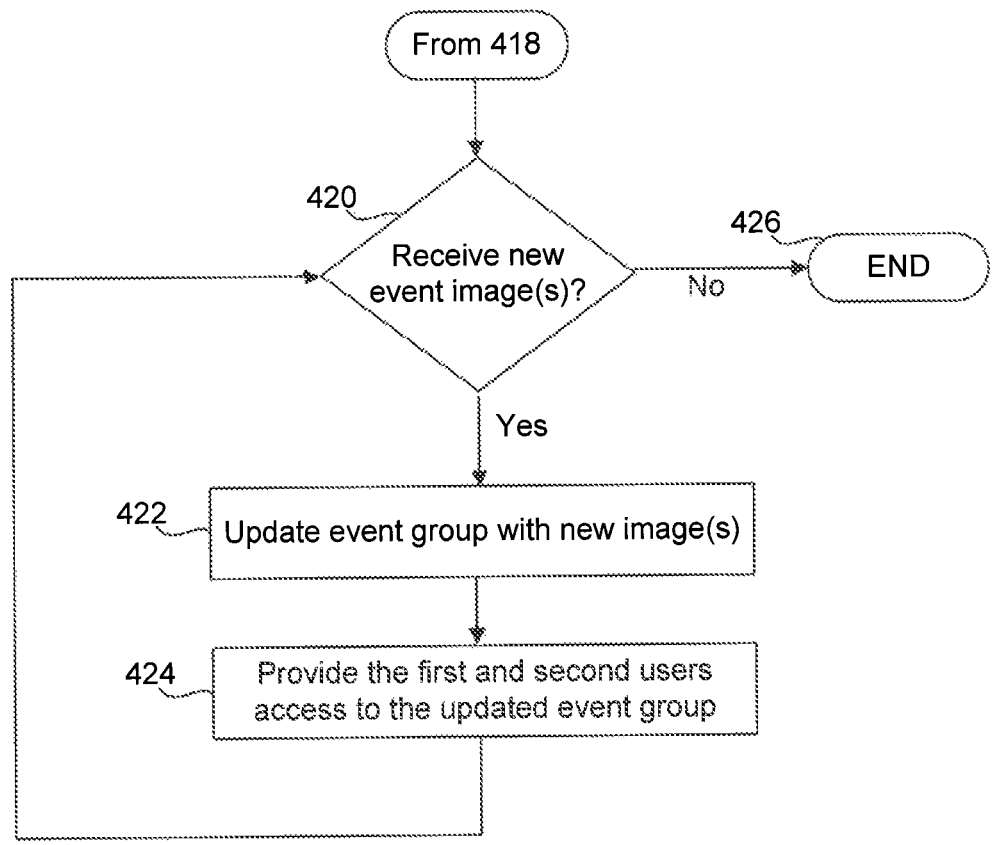
FIG. 4B is a flowchart of an example of a method for updating an event group with one or more new images in accordance with an embodiment.

FIGS. 4A and 4B are process flowcharts of a method 400 for automatically sharing media between users. Method 400 includes steps 402, 404, 406, 408, 410, 412, 414, 416, 418, 420, 422, 424, and 426. Benefits of method 400 include, but are not limited to, a faster, more efficient, and automated way for users to share media between one another. Moreover, method 400 alleviates the burden for users of having to manually group images into albums, add descriptors to the album (e.g., album titles), and share the albums with other users.

For ease of explanation, system 100 of FIG. 1 and system 300 of FIG. 3, as described above, will be used to describe method 400, but is not intended to be limited thereto. Referring back to FIG. 3, method 400 may be performed, for example, by server(s) 150 via media sharing service 152. Method 400 begins in step 402 of FIG. 4A and proceeds to step 404, which includes receiving a first collection of images associated with a first user. Step 404 may be performed, for example, by media input module 330. In an embodiment, the first collection of images may be received directly from the first user via the first user's client device, such as, for example, client device 110. In another embodiment, the first collection may be stored for later retrieval in one or more media databases, such as, for example, media database 320. For example, the first collection of images may have been previously uploaded by the first user via, for example, a photo sharing site to which media database 320 may be coupled, as described above. Also, as described above, the images of the first collection may be digital photos, frames from a digital video, or any combination thereof.

Method 400 proceeds to step 406, which includes determining a first content data for each image in the first collection. Step 406 may be performed, for example, by face recognition module 332, landmark recognition module 334, object recognition module 336, media extractor module 338, or any combination thereof. As described above, the first content data may include information comprising recognized faces, landmarks, and/or objects within the first collection of images. Also as described above, the first content data may additionally include metadata extracted from the first collection including, but not limited to, the time and location of when and where the images were captured.

Method 400 then proceeds to step 408, which includes segmenting the first collection into a first set of one or more albums. Step 408 may be performed, for example, by album segmentation module 342 of media sharing module 340. As described above, the first collection is segmented based on the determined first content data in step 406.

Steps 410, 412, and 414 of method 400 are similar to above-described steps 404, 406, and 408, respectively. However, steps 410, 412, and 414 correspond to a second collection of images associated with a second user. Thus, in step 410, a second collection of images associated with the second user is received. Like the first collection of images in step 404, the second collection may be received directly from second user or accessed from a media database, such as, for example, media database 320. Step 410 may also be performed, for example by media input module 330. In step 412, a second content data for each image in the second collection is determined. Step 412 may be performed, for example, by face recognition module 332, landmark recognition module 334, object recognition module 336, media extractor module 338, or any combination thereof. In step 414, the second collection is segmented into a second set of one or more albums based on the second content data. Step 414 may be performed, for example, by album segmentation module 342.

In an embodiment, the first and second sets of one or more albums are associated with the first and second users, respectively. As described above, the first and second users may also be associated with each other. In addition, the first and second users may have first and second sharing preferences, respectively. The sharing preference of each user identifies the media sharing rights and privileges the user provides to the other user. For example, the first user may have a sharing preference that allows sharing media with the second user by providing the second user access rights to media associated with the first user. The second user may also have a similar sharing preference corresponding to the first user.

Once the first and second collections are segmented into respective first and second sets of one or more albums, method 400 proceeds to step 416. In step 416, the first and second sets are clustered into an event group according to the first and second content data and sharing preferences of the first and second users. Step 416 may be performed, for example, by event clustering module 344 in combination with sharing manager 346.

After the event group is created in step 416, method 400 proceeds to step 418, which includes providing the first and second users with access to the event group. Although not shown in method 400, the first and second users may also be associated with the event group, according to an embodiment. In addition, the event group and any associations with first and second users may be stored, for example, by event clustering module 344 in event database 360 via communication line 308, as illustrated in FIG. 3. Step 418 may be performed, for example, by sharing manager 346. In an embodiment, method 400 may also include an additional step (not shown), which includes sending a notification of the event group to the first and second users. The notification may include an access link to the event group, as described above. This optional step may be performed, for example, by notification manager 348.

Next, method 400 proceeds to step 420 of FIG. 4B, which includes receiving one or more new images representing scenes from a particular event, to which the event group corresponds. For example, the event group created in step 416 may include images that were captured by the first and second users during a particular event. After the event group is created, the first and/or second users may send new images also captured from the event. The new images may be sent by the first and/or second users from, for example, their mobile devices during the event or may be uploaded to, for example, a media sharing site after the event. In the former scenario, step 420 includes receiving the new images directly from one or both of the users. However, in the latter scenario, step 420 includes accessing the uploaded images from a media database coupled to or integrated with the media sharing site. The media database may be, for example, media database 320 of FIG. 3.

In a further scenario, a first set of new images from the event may be received directly from the first user and a second set of new images from the event may have been uploaded by the second user to a media sharing site. In this scenario, step 420 includes receiving new images directly and accessing new images from the media database. It should be noted that either user may choose to send images directly or upload images to a media sharing site. Step 420 may be performed, for example, by media input module 330 of FIG. 3.

If new images are received or accessed, method 400 proceeds to step 422, which includes updating the event group with the received or accessed new images, and to step 424, which includes providing the first and second users access to the updated event group. Providing the first and second users access to the updated event group enables sharing the event group between the first and second users. It should be noted that both first and second users are provided access to the event group regardless of whether the new images themselves were originally sent or uploaded by only one of the users. Step 422 may be performed, for example, by event clustering module 344. Step 424 may be performed, for example, by sharing manager 346. In an embodiment, method 400 may include an additional step (not shown) of sending the first and second users a notification of the updated event group. This step may be performed, for example, by notification manager 348. If no new images are received or accessed, method 400 concludes at step 426.

In an embodiment, steps 420, 422 and 424 enable automatic media sharing between the first and second users via the click of a shutter. For example, the new image(s) received in step 420 may be from a user, who captured the image using an application (e.g., client application 112) executing on a computing device with an integrated digital camera (e.g., client device 110 of FIG. 3) or a standalone image capturing device, such as, for example, a digital camera with an EYE-FI card (e.g., client device 310 of FIG. 3). Once the image(s) is received, the event group is automatically updated, without user intervention, with new image(s) in step 422, and the updated event group is automatically shared, without user intervention, between the users in step 424.

One advantage of method 400 is that it enables automatic sharing of media between users (in step 424) without requiring users to manually label and group images and collections of images. This leads to a faster, easier, and more efficient user experience for sharing media, which benefits the user who captures the media by making it easier to share media. Furthermore, other users associated with the user are also benefited as it increases the likelihood that media captured by the user will be shared.

B. Client Application

Figure 5:
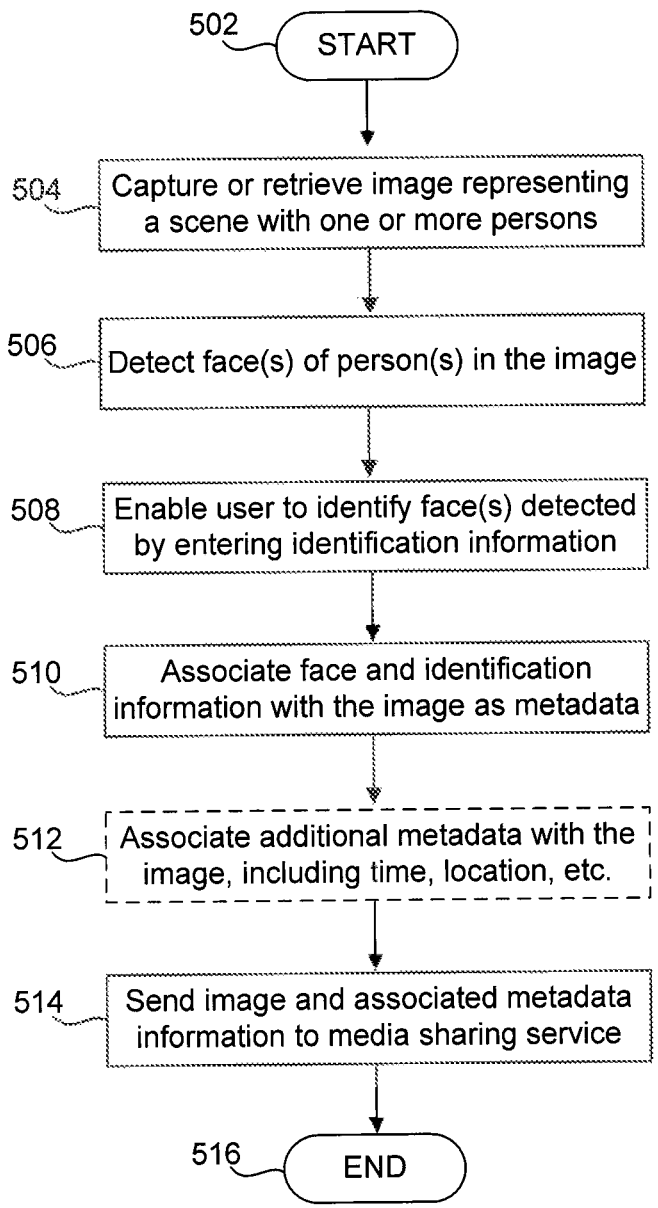
FIG. 5 is a flowchart of an example of a method for capturing and sending media using a client application in accordance with an embodiment.

FIG. 5 is a flowchart of an embodiment of an exemplary method 500 for sending media using a client application. For ease of explanation client application 112 of FIG. 2 and system 300 of FIG. 3 will be used to facilitate the description of method 500. Further, for ease of explanation, method 500 will be described in the context of a mobile device (e.g., client device 110 of FIG. 1) with an integrated image capturing device, such as, for example, a digital camera. However, based on the description herein, a person of ordinary skill in the relevant art will recognize that method 500 can be integrated within other client applications that can be executed on any type of computing device having a camera or other image capturing device.

Method 500 includes steps 502, 504, 506, 508, 510, 512, 514, and 516. Method 500 begins in step 502 and proceeds to step 504, which involves capturing an image representing a scene with one or persons. The image may be a digital photograph or one or more video frames of a digital video. Step 504 may be performed, for example, by image capture module 210 (e.g., when a user clicks a shutter). In addition to images captured by image capture module 210, method 500 can also use images already captured and stored in local memory (e.g., local memory 116 of client device 110). In step 506, the face of each person in the image is detected as described above. Step 506 may be performed by face detection module 220, described above. Method 500 then proceeds to step 508, which includes obtaining identification information for the face(s) detected.

In one embodiment, obtaining identification information in step 508 includes enabling a user to identify the face(s) detected in the image. The user may identify the face(s) by entering identification information for the person corresponding to the face. Such identification information may include, but is not limited to, a name and/or contact information (e.g., an email address) of the person being identified. For example, the captured image may be displayed on a display coupled to the computing device (e.g., client device 110 of FIG. 1) executing the client application (e.g., client application 112). In addition, the detected face(s) in the image may be shown on the display with a virtual box drawn around the face to demarcate the face(s). The user may enter the name and contact information using a user input device, such as, for example, a touch screen or keyboard (e.g., device input 114). This embodiment of step 508 may be performed, for example, by user interface module 240, described above.

In another embodiment, obtaining identification information in step 508 includes retrieving a stored facial image that matches each detected face from, for example, local memory (e.g., in local memory 116) accessible by client application 112, as described above. In another example, the stored facial image may be retrieved in step 508 from a remote location such as a facial image database (not shown), which can be accessible, for example, by client application 112 over network 140. The stored facial image can also include metadata of its own, including identification information for the identity of the person corresponding to the facial image. For example, the identification information may include a name and contact information. Thus, in this embodiment, step 508 would no longer require the user to provide the identification information for the detected face. The advantage of this embodiment is allowing method 500 to proceed without further user intervention. This embodiment of step 508 may be performed, for example, by face detection module 220 in combination with a face recognition module, such as, for example, face recognition module 332 of media sharing service 152, described above.

Once the detected faces have been identified, method 500 proceeds to step 510, which involves associating detected face information and identification information (e.g., name and contact information) with the image. Such information may be associated with the image as metadata. In optional step 512, additional metadata may be associated with the image including, but not limited to, a time when the image was captured and a location where the image was captured. For example, the location information may only be available if the device executing the client application includes a GPS receiver. Steps 510 and 512 may be performed, for example, by metadata insertion module 230.

After the metadata information is associated with the captured image, method 500 proceeds to step 514, which involves sending the image, including the metadata information, to a media sharing service, such as, for example, media sharing service 152 of FIGS. 1 and 3. The sent image may be received, for example, by media input module 330 of media sharing service 152, shown in FIG. 3. Step 514 may be performed, for example, by image transfer module 250. Method 500 concludes in step 516 once the image has been sent.

One advantage of method 500, particularly in combination with method 400, is that it enables users to automatically share media in a fast and easy way with minimal steps. Media can be shared by a user simply by clicking a shutter (in step 504).

C. Album Segmentation

Figure 6:
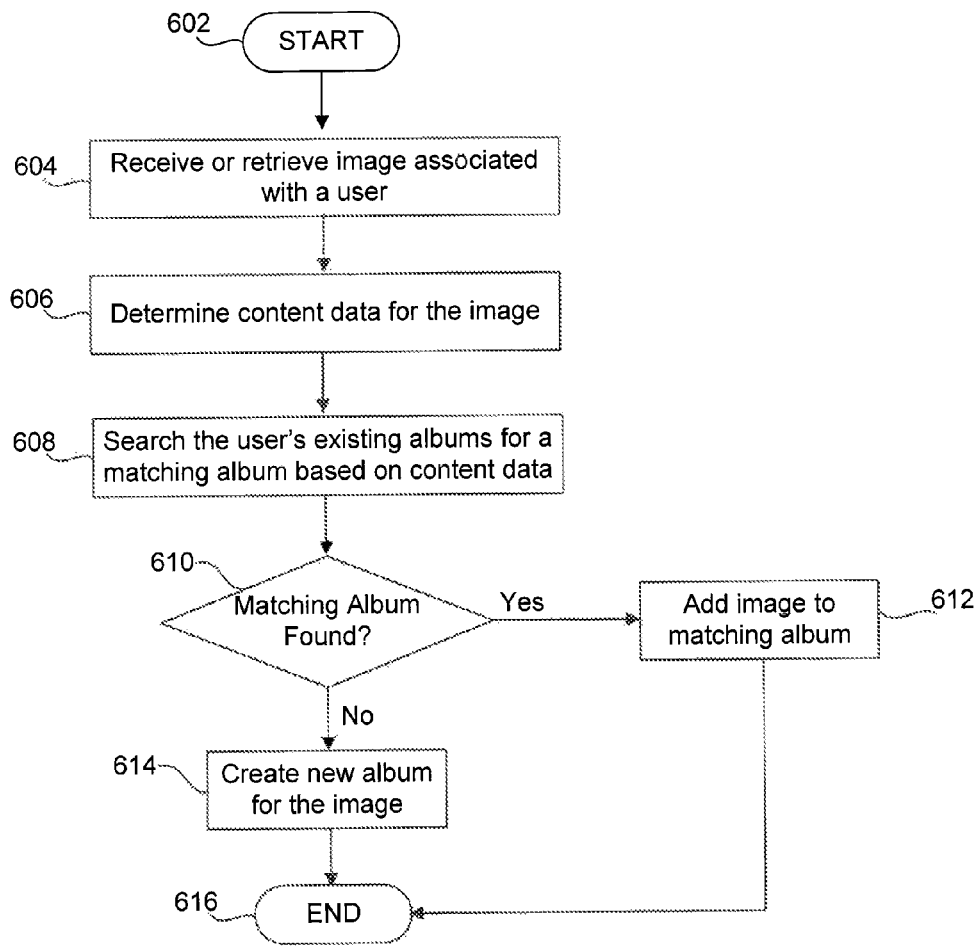
FIG. 6 is a flowchart of an example of a method for grouping images into albums in accordance with an embodiment.

FIG. 6 is a flowchart of an embodiment of an exemplary method 600 for grouping images into albums. Method 600 includes steps 602, 604, 606, 608, 610, 612, 614, and 616. Method 600 starts in step 602 and proceeds to step 604, which includes receiving an image associated with a user. Step 604 may be performed, for example, by media input module 330 of FIG. 3. Upon receipt of the image, method 600 proceeds to step 606, which includes determining content data for the image. The image content data may include, but is not limited to, face recognition information, landmark recognition information, metadata information (e.g., time and location information), and any other types of image content information. Step 606 may be performed, for example, by the subcomponents of media input module 330, including face recognition module 332, landmark recognition module 334, object recognition module 336, metadata extractor module 338, or any combination thereof.

Method 600 proceeds to step 608, which includes searching the user's existing albums, if any, for a matching album based on the image content data. An existing album may be considered to be a match if the existing album contains images with substantially similar content data as the received image. A person skilled in the relevant art given this description would appreciate that any one of a number approaches for searching may be used to efficiently search for a matching album. An example of one such approach includes creating a local index, in a database used to store user albums (e.g., album database 350 of FIG. 3), corresponding to one of the dimensions of the image content data. For example, an index corresponding to the album's end timestamp may be created. Such a timestamp index can be used to scan the range from the image timestamp (i.e., the time when the image was captured), minus some predetermined threshold value, to the end of a table in a database. The candidate albums produced from the scan could then be filtered by the remaining dimensions of the image content data, such as, for example, location information. The advantage of this example approach is reducing the number of albums to search.

If a matching album is found in step 608, method 600 proceeds to step 610, in which the image is added to the matching album. Alternatively, if a matching album is not found in step 608, method 600 proceeds to step 612, in which a new album is created for the image. Steps 608, 610, 612, and 614 may be performed, for example, by album segmentation module 342 of media sharing module 340, shown in FIG. 3. After steps 610 or 612, method 600 concludes at step 614.

D. Event Clustering

Figure 7:
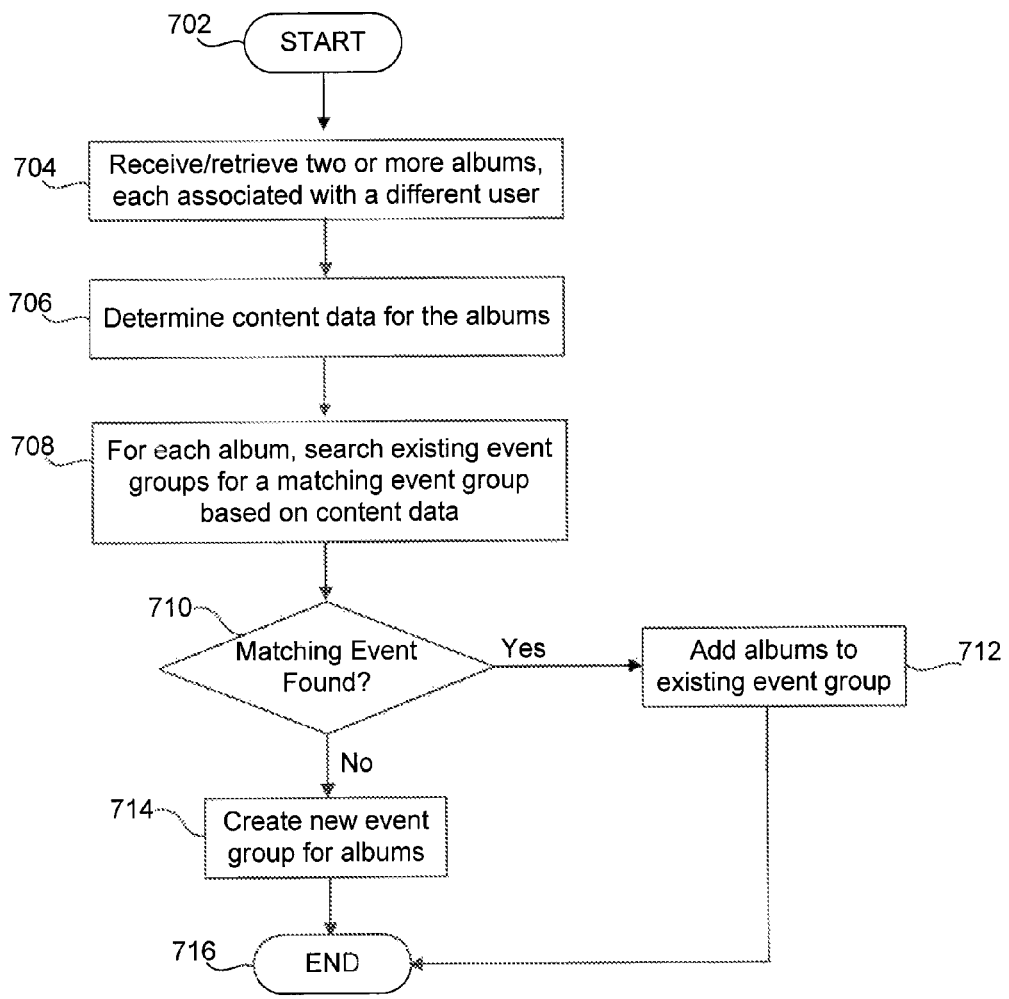
FIG. 7 is a flowchart of an example of a method for grouping albums into event groups in accordance with an embodiment.

FIG. 7 is a flowchart of an embodiment of an exemplary method 600 for grouping albums associated with two or more users into event groups. Method 700 includes steps 702, 704, 706, 708, 710, 712, 714, and 716. Method 700 starts in step 702 and proceeds to step 704, which includes receiving two or more albums, where each album is associated with a different user. Step 704 may be performed, for example, by media input module 330 of FIG. 3. Upon receipt of the albums, method 700 proceeds to step 706, which includes determining album content data for each album. The album content data includes content information corresponding to the images within a given album. Such album content data may include, but is not limited to, face recognition information, landmark recognition information, metadata information (e.g., time and location information), and any other types of album content information. Step 706 may be performed, for example, by the subcomponents of media input module 330, including face recognition module 332, landmark recognition module 334, object recognition module 336, metadata extractor module 338, or any combination thereof.

Method 700 proceeds to step 708, which includes searching existing event groups, if any, associated with the user for a matching album based on the album content data. Like method 600, an existing event group may be considered a match for the album if the existing event group contains albums with substantially similar content data as the received albums. Also like method 600, a person skilled in the relevant art given this description would appreciate that method 700 may utilize any one of a number approaches for searching may be used to efficiently search for a matching event group. For example, like the example in method 600, one approach for method 700 includes creating a local index, in a database used to store event groups (e.g., event database 360 of FIG. 3).

If a matching event group is found in step 708, method 700 proceeds to step 710, in which the albums are added to the matching event group. Alternatively, if a matching event group is not found in step 708, method 700 proceeds to step 712, in which a new event group is created for the albums. Steps 708, 710, 712, and 714 may be performed, for example, by event clustering module 344 of media sharing module 340, shown in FIG. 3. After steps 710 or 712, method 700 concludes at step 714.

In an embodiment, method 700 may also include one or more additional steps (not shown), which involve querying a user for a suggested event group. In this embodiment, method 700 may suggest one or more event groups, for example, by displaying a list of event groups, in which to include the user's one or more albums. The list may be displayed, for example, at a media sharing site accessed by the user. Once the user selects an event group, method 700 may proceed to inserting the one or more albums associated with the user into the user-selected event group. The additional steps involving querying the user and receiving the user's selection may be performed, for example, by sharing manager 346 of FIG. 3. The steps involving adding the albums to the selected event group may be performed, for example, by event clustering module 344.

IV. Example Computer System Implementation

Aspects of the present disclosure shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
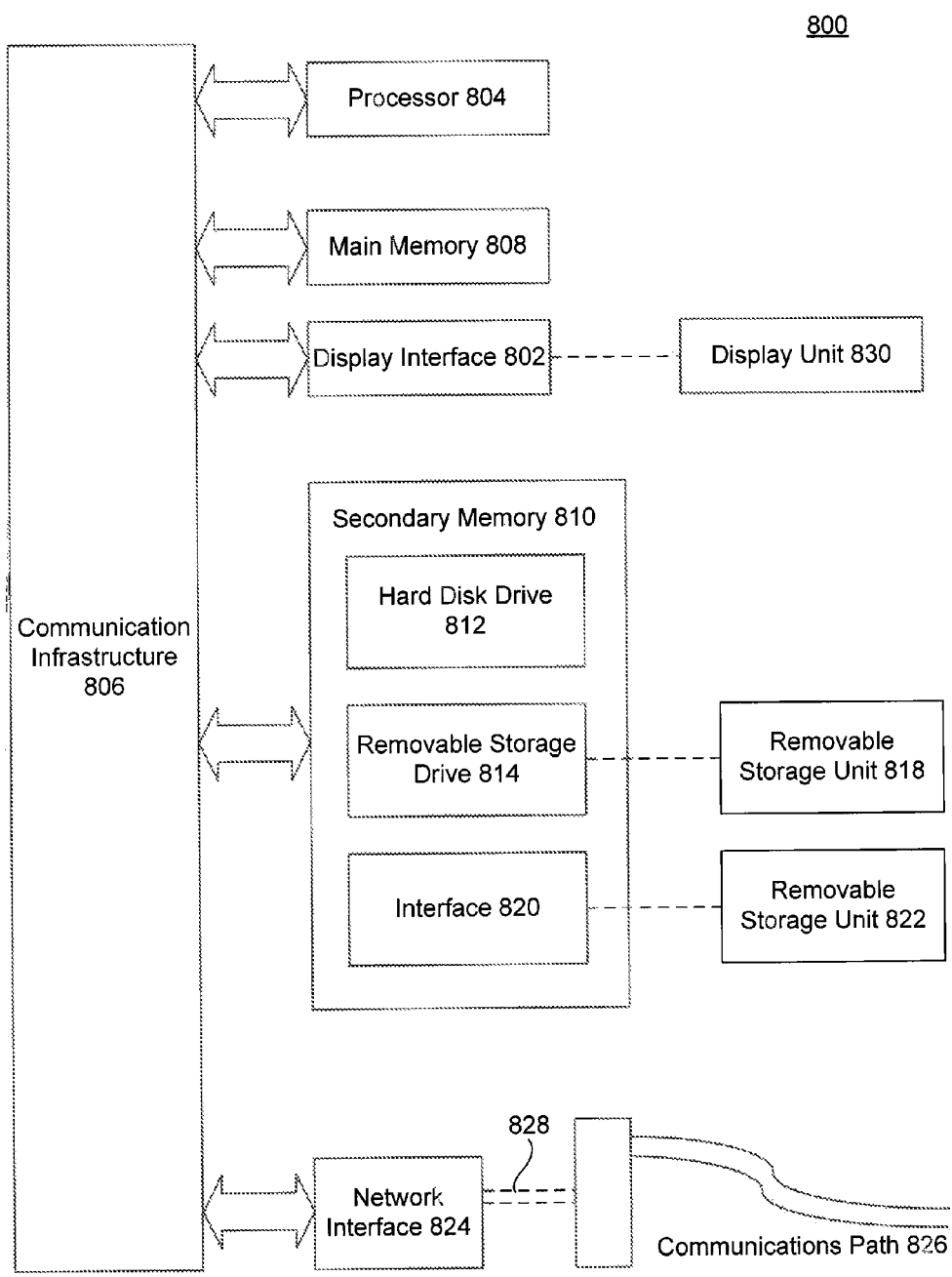
FIG. 8 is a diagram of an example of a computer system in which embodiments can be implemented.

FIG. 8 illustrates an example computer system 800 in which embodiments of the present disclosure, or portions thereof, may by implemented as computer-readable code. For example, system 300 of FIG. 3, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the disclosure are described in terms of this example computer system 800. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement the present disclosure as discussed herein. In particular, the computer programs, when executed, enable processor device 804 to implement the processes of the present disclosure, such as the stages in the methods illustrated by flowcharts 400, 600, and 700 of FIGS. 4A-B, 6, and 7, respectively, discussed above. Accordingly, such computer programs represent controllers of the computer system 800. Where an embodiment of the present disclosure is implemented using software, the software may be stored in a computer program product and loaded into computer system 800 using removable storage drive 814, interface 820, hard disk drive 812, or communications interface 824.

Embodiments of the disclosure also may be directed to computer program products comprising software stored on any computer useable medium. Such software, when executed in one or more data processing device, causes a data processing device(s) to operate as described herein. Embodiments of the disclosure employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

V. Conclusion it is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so (ally reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for automatically sharing media between users, comprising:

receiving at a client device a first image depicting a scene with one or more persons;

identifying at the client device face detection information for each person in the first image;

automatically, without user intervention, obtaining at the client device, identification information for each face detected;

associating at the client device the face detection information and identification information with the first image;

sending from the client device the first image, including the associated face detection information and identification information to a server hosting a media sharing service; and receiving at the client device an access link to an event group, wherein the event group includes an album of the first image and a first collection of images that share a set of common features with the first image.

2. The method of claim 1, further comprising:

receiving one or more additional images depicting the scene;

identifying at the client device face detection information for each person in the one or more additional images;

automatically, without user intervention, obtaining at the client device identification information for each face detected in the one or more additional images;

associating at the client device the face detection information and identification information with the one or more additional images;

sending from the client device the one or more additional images, including the associated face detection information and identification information to the server hosting the media sharing service; and receiving, at the client device, the access link to the event group, wherein the event group includes an updated album with a second collection of images that share a set of common features with the one or more additional images.

3. The method of claim 2, wherein the one or more additional images are received in response to a click of an image shutter device.

4. The method of claim 1, wherein the first image is a frame from at least a portion of a first video.

5. The method of claim 1, further comprising:
determining a first content data for the first image, wherein determining the first content data comprises recognizing one or more faces in the first image, the first content data including an identity of the one or more faces.

6. The method of claim 5, wherein recognizing the first face comprises retrieving a stored facial image that matches each detected face.

7. The method of claim 1, further comprising:
determining a first content data for the first image, wherein determining the first content data comprises recognizing one or more landmarks in the first image, the first content data including an identity of the one or more landmarks.

8. The method of claim 7, wherein determining the first content data comprises recognizing a first landmark in images of the first collection, the first content data corresponding to the first landmark.

9. The method of claim 8, wherein determining the first content data comprises recognizing one or more objects in the first image, the first content data corresponding to the first object.

10. The method of claim 9, wherein determining the first content data comprises extracting first metadata from the first image, the first content data corresponding to the first metadata.

11. The method of claim 10, wherein extracting the first metadata comprises extracting a first time when the first image was exposed.

12. The method of claim 10, wherein extracting the first metadata comprises extracting a first location where the first image was exposed.

13. A system for automatically sharing media between users, comprising:
one or more processing devices;
an image capture module configured to receive, via the one or more processing devices, a first image depicting a scene with one or more persons;
a face detection module configured to identify, via the one or more processing devices, face detection information for each person in the first image;
a user interface module configured to automatically, without user intervention, obtain, via the one or more processing devices, identification information for each face detected;
a metadata insertion module configured to associate, via the one or more processing devices, the face detection information and identification information with the first image;
an image transfer module configured to send, via the one or more processing devices, the first image, including the associated face detection information and identification information to a server hosting a media sharing service; and
a notification manager configured to receive, via the one or more processing devices, an access link to an event group, wherein the event group includes an album of the first image and a first collection of images that share a set of common features with the first image.

14. The system of claim 13, wherein the image capture module is further configured to receive one or more additional images depicting the scene;
the face detection module is further configured to identifying face detection information for each person in the one or more additional images;
the user interface module is further configured to automatically, without user intervention, obtain identification information for each face detected in the one or more additional images;
the metadata insertion module is further configured to associate the face detection information and identification information with the one or more additional images;
the image transfer module is further configured to send the one or more additional images, including the associated face detection information and identification information to the server hosting the media sharing service; and
the notification manager is further configured to receive the access link to the event group which includes an updated album with the one or more additional images and a second collection of images that share a set of common features with the one or more additional images.

15. The system of claim 14, wherein the one or more additional images are received in response to a click of an image shutter device.

16. The system of claim 13, wherein the first image is a frame from at least a portion of a first video.

17. The system of claim 13, wherein the face detection module is further configured to determine a first content data for the first image.

18. The system of claim 17, wherein the face detection module is further configured to recognize one or more faces in the first image, the first content data including an identity of the one or more faces.

19. The system of claim 18, wherein the face detection module is further configured to retrieve a stored facial image that matches each detected face.

20. A non-transitory computer-readable storage medium storing instructions executable by one or more computers which, upon execution, cause the one or more computers to perform operations comprising:
receiving a first image depicting a scene with one or more persons;
identifying face detection information for each person in the first image;
automatically, without user intervention, obtaining identification information for each face detected;
associating the face detection information and identification information with the first image;
sending the first image, including the associated face detection information and identification information to a server hosting a media sharing service; and
receiving an access link to an event group, wherein the event group includes an album of first image and a first collection of images that share a set of common features with the first image.

* * * * *